US012065011B2

(12) United States Patent
Pettersson et al.

(10) Patent No.: US 12,065,011 B2
(45) Date of Patent: Aug. 20, 2024

(54) SUSPENSION DEVICE FOR TRACKED VEHICLES

(71) Applicant: KOMATSU FOREST AB, Umeå (SE)

(72) Inventors: Henry Pettersson, Täfteå (SE); Tommy Englund, Umeå (SE)

(73) Assignee: KOMATSU FOREST AB, Umeå (SE)

( * ) Notice: Subject to any disclaimer, the term of this patent is extended or adjusted under 35 U.S.C. 154(b) by 974 days.

(21) Appl. No.: 16/495,043

(22) PCT Filed: Mar. 6, 2018

(86) PCT No.: PCT/SE2018/050210
§ 371 (c)(1),
(2) Date: Sep. 17, 2019

(87) PCT Pub. No.: WO2018/169468
PCT Pub. Date: Sep. 20, 2018

(65) Prior Publication Data
US 2020/0009932 A1    Jan. 9, 2020

(30) Foreign Application Priority Data
Mar. 17, 2017  (SE) .................................. 1750318-6

(51) Int. Cl.
*B60G 7/00*     (2006.01)
*B62D 21/04*    (2006.01)
(Continued)

(52) U.S. Cl.
CPC ............ *B60G 7/001* (2013.01); *B62D 55/112* (2013.01); *B62D 55/116* (2013.01); *B62D 21/04* (2013.01); *B62D 55/0655* (2013.01)

(58) Field of Classification Search
CPC .. B62D 55/112; B62D 55/116; B62D 55/065; B62D 21/04; B62D 55/1125; B60G 7/001
(Continued)

(56) References Cited

U.S. PATENT DOCUMENTS 1,429,472 A * 9/1922 Wickersham .......... B62D 55/10
                                                    180/9.56
3,249,026 A * 5/1966 Curlett .................... E02F 3/841
                                                    404/84.2

(Continued)

FOREIGN PATENT DOCUMENTS

EP         1308378 A1    5/2003
JP         62-214065 A   9/1987
(Continued)

OTHER PUBLICATIONS

JP2018-102156, English translation (Year: 2018).*
(Continued)

*Primary Examiner* — Anne Marie M Boehler
(74) *Attorney, Agent, or Firm* — Morrison & Foerster LLP

(57) ABSTRACT

The invention concerns a suspension device for a tracked vehicle, comprising a track assembly (10) at the side of a centre beam (14), comprising a track support beam (20), two wheels (21, 22), several support wheels (23) and an endless track (11) that runs in a plane of rotation (A, A), a first suspension mounting with which the support wheels (23) are suspended at the track support beam (20) in a manner that allows pivoting, a second suspension mounting comprising a combination of a first spring strut (25A) and a first pendulum arm (26A) and a second spring strut (25B) and a second pendulum arm (26B) with which combinations the centre beam (14) of the chassis is spring-damped at a forward and rear end of the track support beam (20). According to the invention, a first pendulum arm (26A) is located in front of the second pendulum (26B), each pendulum arm (26A, 26B) is fixed at its first end in a manner that allows pivoting at a first joint (27, 27) the centre beam (14) of the chassis and at its second end at a second joint (28, 28) at the track support beam (20), each spring strut (25A,
(Continued)

Figure 1:
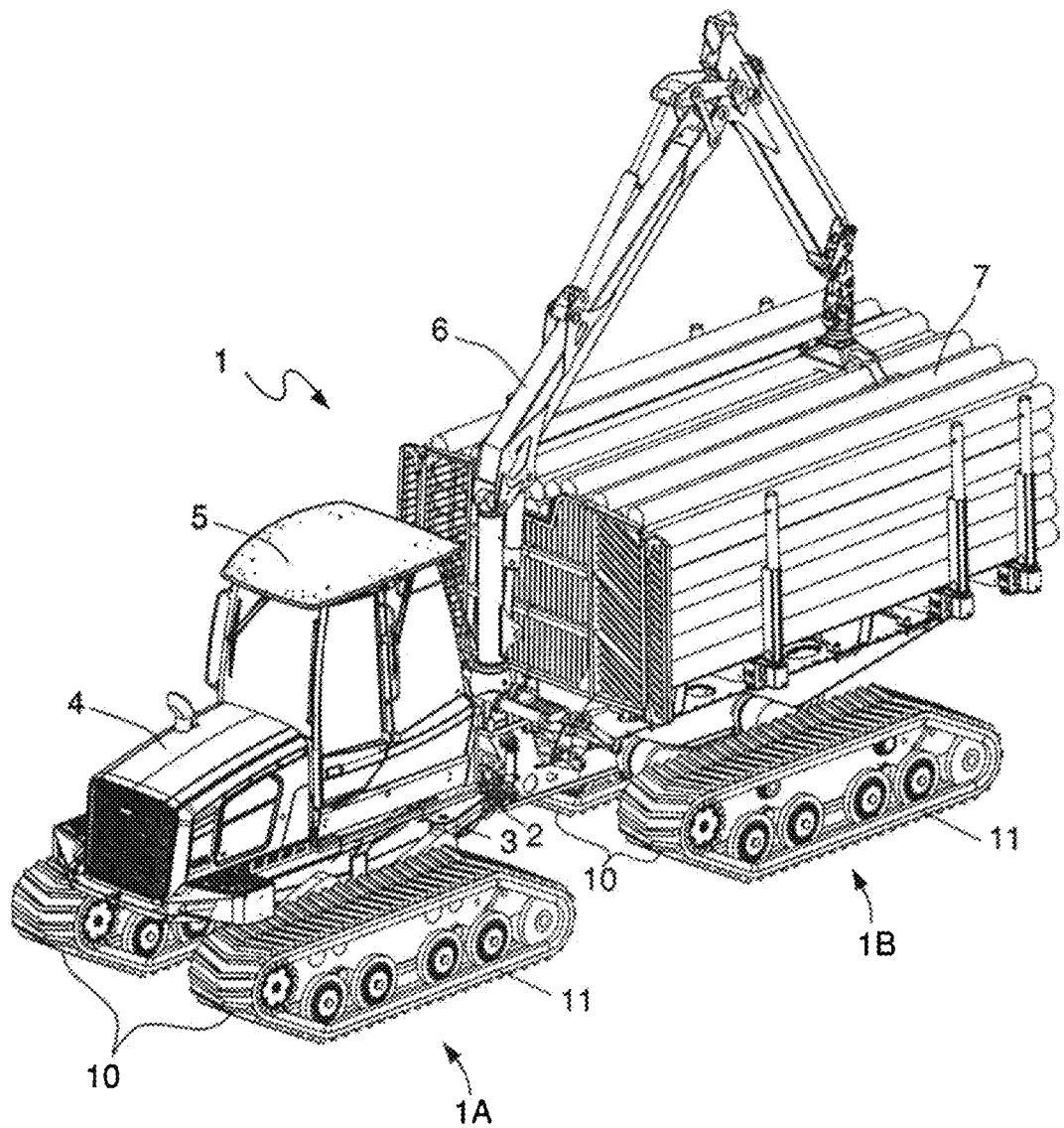

25B) is fixed at one of its ends (30, 30) in a jointed manner at the centre beam (14) of the chassis and at its second end (31, 31) is fixed in a jointed manner at a pendulum arm (26A, 26B), the pendulum arms (26A, 26B) pivot in a plane-parallel manner with the planes of rotation (A, A) of the track (11).

7 Claims, 7 Drawing Sheets

(51) Int. Cl.
  *B62D 55/065* (2006.01)
  *B62D 55/112* (2006.01)
  *B62D 55/116* (2006.01)

(58) Field of Classification Search
  USPC .................................... 305/132, 134, 142
  See application file for complete search history.

(56) References Cited

U.S. PATENT DOCUMENTS

| | | | | |
|---|---|---|---|---|
| 5,749,423 | A * | 5/1998 | Burckhartzmeyer | B62D 55/30 305/132 |
| 6,962,222 | B2 * | 11/2005 | Kirihata | B62D 55/116 180/9.5 |
| 7,562,727 | B1 * | 7/2009 | Hoffart | B62D 55/1125 180/9.1 |
| 7,862,131 | B2 * | 1/2011 | Poirier | B62D 55/14 180/9.5 |
| 9,694,861 | B2 * | 7/2017 | Thomas | E02F 9/166 |
| 9,764,784 | B2 * | 9/2017 | Brazier | B62D 55/15 |
| 2016/0332681 | A1 * | 11/2016 | Missotten | A01D 41/12 |
| 2018/0043932 | A1 * | 2/2018 | Borud | B62D 21/18 |
| 2018/0162465 | A1 * | 6/2018 | Visscher | B62D 55/06 |
| 2019/0359268 | A1 * | 11/2019 | Hellholm | B60G 17/016 |
| 2019/0359269 | A1 * | 11/2019 | Hellholm | B62D 55/112 |
| 2021/0001934 | A1 * | 1/2021 | Leitner | B62D 55/10 |
| 2021/0331752 | A1 * | 10/2021 | Bennett | B62D 55/112 |
| 2022/0032700 | A1 * | 2/2022 | Pettersson | B62D 59/02 |
| 2022/0105998 | A1 * | 4/2022 | Poulin | B62D 55/116 |

FOREIGN PATENT DOCUMENTS

| | | | | |
|---|---|---|---|---|
| JP | 9-154310 A | | 6/1997 | |
| JP | 2003-40153 A | | 2/2003 | |
| JP | 2008-137435 | * | 6/2008 | |
| JP | 4420771 B2 | | 12/2009 | |
| JP | 2018-102156 | * | 7/2018 | ........... B62D 55/116 |
| SE | 1350562 A1 | | 11/2014 | |
| WO | 2014/182235 A1 | | 11/2014 | |

OTHER PUBLICATIONS

JP2008-137435, English translation (Year: 2008).*
International Preliminary Report on Patentability Received for PCT Application No. PCT/SE2018/050210, mailed on Sep. 26, 2019, 8 pages.
International Search Report and Written Opinion Received for PCT Application No. PCT/SE2018/050210, mailed on Apr. 20, 2018, 11 pages.

* cited by examiner

SUSPENSION DEVICE FOR TRACKED VEHICLES

CROSS REFERENCE TO RELATED APPLICATIONS

This application is a national stage application under 35 U.S.C. § 371 of International Application No. PCT/SE2018/050210, filed internationally on Mar. 6, 2018, which claims priority to SE 1750318-6, filed Mar. 17, 2017.

The present invention concerns a suspension device for tracked vehicles according to the introduction to Aspect A, below. The invention concerns also a tracked vehicle such as a vehicle known as a "forwarder" according to Aspect K, below.

Tracked vehicles of the present type are often driven on uneven ground and may impact obstacles of various types in the terrain. A tracked vehicle, a vehicle whose wheels are united by tracks, is generally equipped with a pair of track assemblies, i.e. one track assembly on each side of a central beam that is a component of the frame or chassis of the vehicle. It is typical that tracked vehicles are articulated (with an articulated frame). For articulated vehicles that include a combination of two jointed vehicle parts, a forward vehicle part and a rear vehicle part that pivots by being set at an angle through a jointed waist, each forward and rear vehicle part is equipped with a track assembly.

Tracked forestry machines have a lifting crane, the arm of which can extend to a distance from the vehicle and whose free end supports a timber working head for processing trees, normally in the form of a timber gripper or a harvester. The crane with its timber working head, which is located at the end of the arm, together with its load, if any, influence the position of the centre of gravity the vehicle when the crane arm is extended far out from the vehicle. In order for the vehicle not to tip over as a consequence of the turning moment that arises, it is important that the track assemblies be so designed that the said turning moment can, as far as is possible, be counteracted and balanced by some type of stabilisation function arranged at the track assembly.

In order to work efficiently, each tracked vehicle must, with good driver comfort, be able to displace itself through terrain, which may vary with respect to both the support strength and nature of the ground. A pair of track assemblies must be so designed that it permits the tracks, with the greatest possible surface contact with respect to area, i.e. with the greatest possible "traction", to follow the contour of the surface even if the tracks move over a rock, tree stump, or similar obstacle in the terrain.

In order to meet this requirement, there has in recent years been developed a new type of track assembly with significantly improved suspension mounting. Characteristic for this new type of suspension mounting is, in particular, that it offers significantly improved spring damping of the chassis or centre beam of the vehicle to the track assembly through the track assembly being suspended, in a manner that allows pivoting, at both its forward and its rear ends, at the chassis with a combination of pendulum arm and spring struts. As a consequence of this new type of track assembly, levels of driver comfort and motion efficiency are obtained for tracked vehicles that are comparable to those of conventional wheeled vehicles.

Such a suspension device for a tracked vehicle is known from SE 1350562 A1. Hereby there is described a vehicle whose track assemblies, one on each side of a centre beam that is a component of the chassis of the vehicle, comprise a track support beam, two wheels that are mounted in bearings on axles in a manner that allows rotation at a forward and at a rear end of the track support beam, and one of which wheels is a driving wheel, several support wheels and an endless track that extends over the said wheels and support wheels, a first suspension mounting with which the support wheels are spring-loaded suspended at the track support beam, one at each end of a transverse pendulum arm, in particular of A-arm type, a second suspension mounting that is arranged between the two wheel axles of the track support beam and the centre beam of the chassis, and comprising a combination of spring strut and pendulum arm with which the centre beam of the chassis is spring-damped relative to the track support beam with the said combination at both its forward and rear ends.

One disadvantage of the said known suspension device is that it results in that a vehicle equipped with the suspension device adds considerably to the assembled width of the track assembly and in this way also to that of the vehicle. This is, in particular, a consequence of the pendulum arms of the suspension device being transverse and of such a pair of track assemblies for this reason demonstrating a relatively large width and track gauge between the tracks of the vehicle that run parallel to each other. For this reason the suspension device is less suitable for use for a track assembly at a forestry machine, and there is, for reasons that are easy to understand, a desire for a vehicle intended to be driven in closely packed forestry stands that has compact track assemblies with limited width, and suspension devices that do not add such a large amount to the sideways width.

A second disadvantage with said known suspension devices for a tracked vehicle and that causes it to be less suitable for use in a forestry machine, particularly when working in demanding hilly terrain, depends on the open design of the suspension device where the exposed and unprotected positions of the components that are part of the suspension system mean that they are readily liable to damage.

A further disadvantage of the said known suspension device is not only that it demonstrates a relatively large track gauge between the tracks of the vehicle that run parallel to each other, but also that the track gauge will vary during the suspension motion, when the said obliquely set pendulum arms of, for example, the suggested A-arm type, pivot. Paradoxically, the problem with variation of the track gauge becomes greater if one attempts to make the track assembly more narrow by limiting the length of protrusion of the pendulum arms, the A-arms, in the sideways direction from the vehicle.

One purpose of the present invention is, therefore, to achieve an improved suspension device for a tracked vehicle that does not exhibit the problems described above.

A second purpose of the invention is to achieve a tracked vehicle, in particular a forestry machine that, despite being tracked, offers a driver comfort, a motion efficiency and a limited width and track gauge that can be compared with those of corresponding wheeled forestry machines.

The purpose of the invention specified in the introduction is achieved through a suspension device for a tracked vehicle that demonstrates the distinctive features and characteristics that are specified in Aspect A, below.

The subsequently mentioned purpose is achieved through a tracked vehicle that demonstrates the distinctive features and characteristics that are specified in Aspect K, below.

The insight that forms the basis for the invention is that a suspension device that does not add to the width of a tracked vehicle in the sideways direction in a manner that is worthy of mention can be obtained if the spring damping combination of spring strut and pendulum arm, with which a centre beam that is a component of the vehicle is so suspend in a sprung manner at a forward and a rear end of a track support beam, that pairwise operating pendulum arms, one on each side of the chassis of the vehicle, can pivot in planes that are parallel with the plane of rotation of the track.

With a suspension device of the present type, such as it is characterised by the Aspects, below, a tracked vehicle, in particular a forestry machine that offers not only limited width with a narrow track gauge but also driver comfort and motion efficiency, can be achieved.

According to one embodiment of the present invention one pendulum arm of a pair may be located in front of the second, where each pendulum arm is fixed at its first end in a manner that allows pivoting at a first joint in a centre beam that is a component of the chassis, and is fixed at its second end in a manner that allows pivoting at a second joint in a track support beam that is a component of a bogie stand, and each spring strut is fixed at one of its ends in a jointed manner at the centre beam of the chassis and at the other of its ends in a jointed manner at the pendulum arm.

According to a further embodiment of the invention, the two pendulum arms may comprise double-armed levers whose lever arms are united at an intermediate web, where the intermediate web of a first pendulum arm is mounted in bearings in a manner that allows pivoting at a first joint in the centre beam of the chassis, and the web of a second pendulum arm is mounted in bearings in a manner that allows pivoting at a second joint in the centre beam of the chassis, such that the said pendulum arms can pivot in planes that are parallel to the plane of rotation of the track.

According to a further embodiment of the invention, the suspension device comprises an arrangement for motion conversion that can convert the rotating motion at a joint between the pendulum arm and the centre beam that is a component of the chassis or the track support beam that is a component of the track assembly to forward and return translational motion.

According to a further embodiment of the invention, the first lever arm of the first pendulum arm and the second lever arms of the second pendulum arm are arranged to pivot each in a plan that is parallel to the other (plane parallel), while being located at a distance from each other, and one longer lever arm that is a component of each pendulum arm pivots in a side compartment that is limited between the centre beam of the chassis and the track support beam, while a shorter second lever arm that is a component of each pendulum arm is protected and discretely incorporated into the chassis through it pivoting in a plane that is located in a compartment that is that limited inside the centre beam of the chassis.

According to a further embodiment of the invention, each spring strut may comprise a gas hydraulic suspension configuration with a pair of hydraulic cylinders for the relevant track assembly of a vehicle. It is appropriate that the said pair of hydraulic cylinders with a forward and rear hydraulic cylinder be arranged to be hydraulically connected such that the flow of hydraulic agent under pressure can be distributed in the desired manner between the forward and rear hydraulic cylinders of the pair of hydraulic cylinders, or the flow of hydraulic agent to and from the said relevant hydraulic cylinder can, by a suitable valve function, be restricted or completely blocked such that the said relevant hydraulic cylinder offers limited spring function or damping or is completely locked in a fixed position. By actively controlling and regulating the relative functions of the hydraulic cylinders, an adaptive damping setting can be obtained that offers regulation of level, in which a hydraulic cylinder can apply a torque to the pendulum arm that is designed as a double-armed lever, which torque counteracts or balances any tendency of a tracked vehicle, in particular a forestry machine, to tip over. The regulation of level of the chassis of a vehicle may, of course, also take place laterally by means of the invention at, for example, sideways directed slopes. Furthermore, the damping characteristic of the suspension device can be easily changed by means of a suitable throttle valve in a hydraulic circuit in which the most suitable damping curve (soft, medium, hard) for the current purpose can be chosen, depending on, for example, whether a forestry machine is being driven with or without load. The regulation of level can also be used to maintain the chassis at a constant height above the ground, independent of load.

Figure 2:
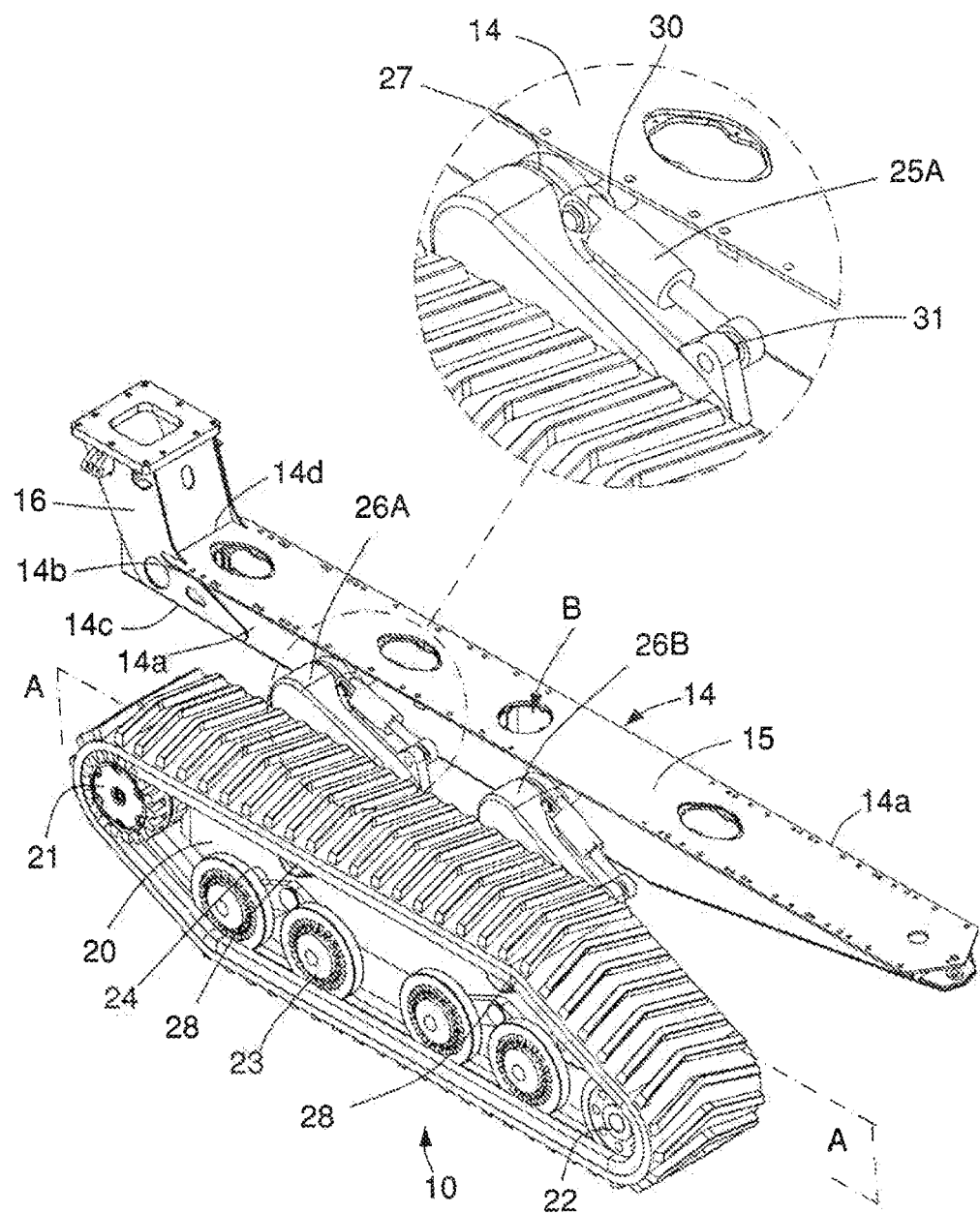
Figure 3:
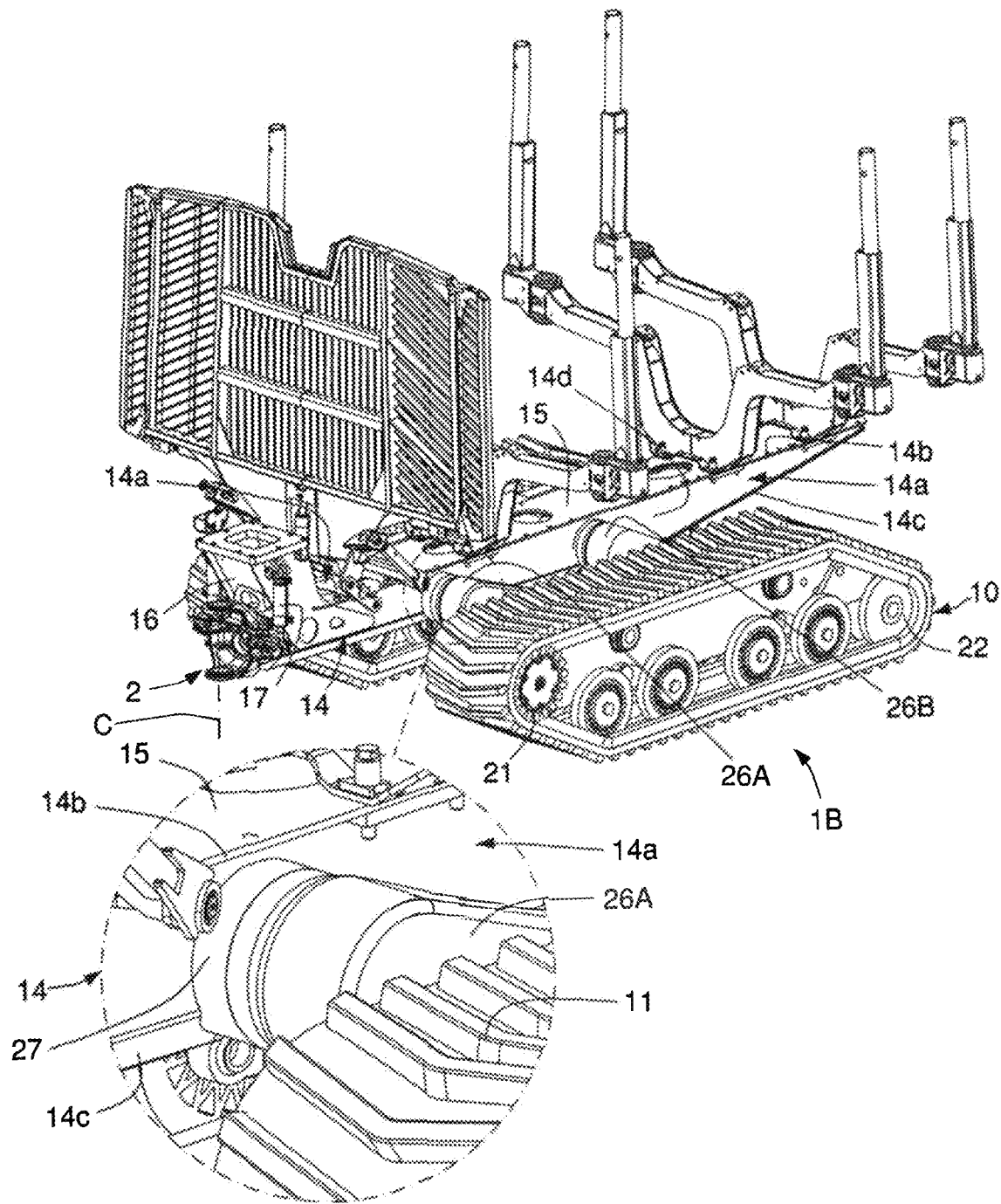
Figure 4:
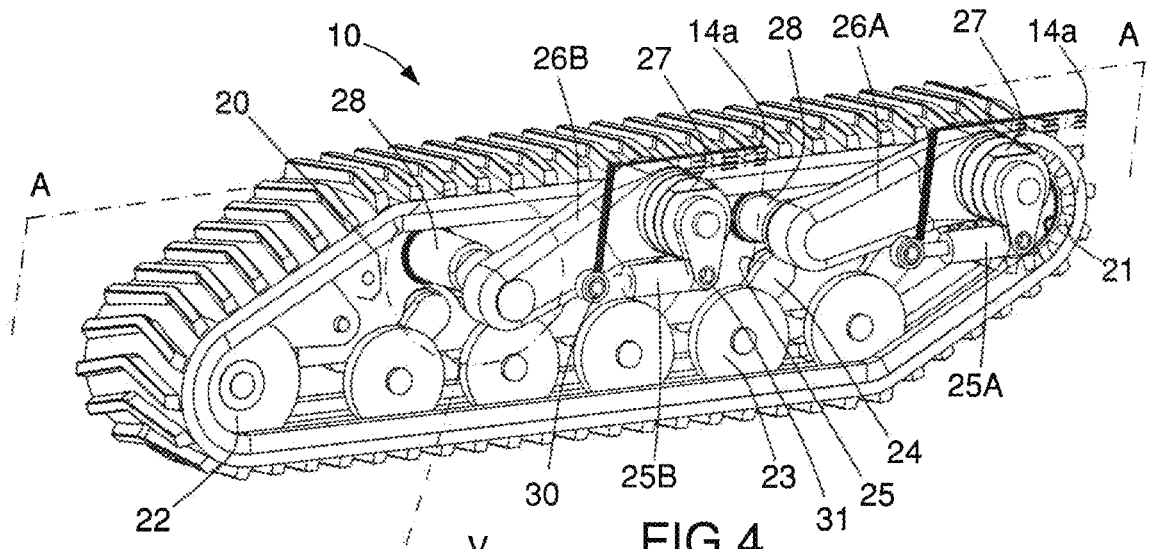
Figure 5:
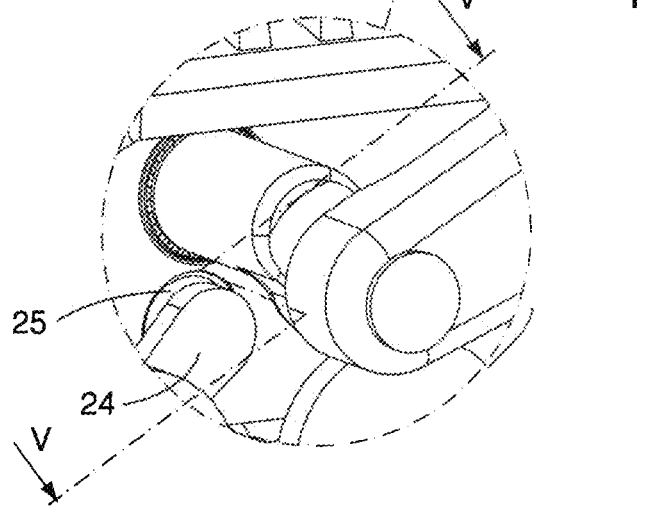
Figure 6A:
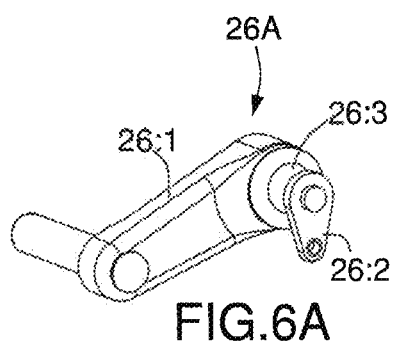
Figure 6B:
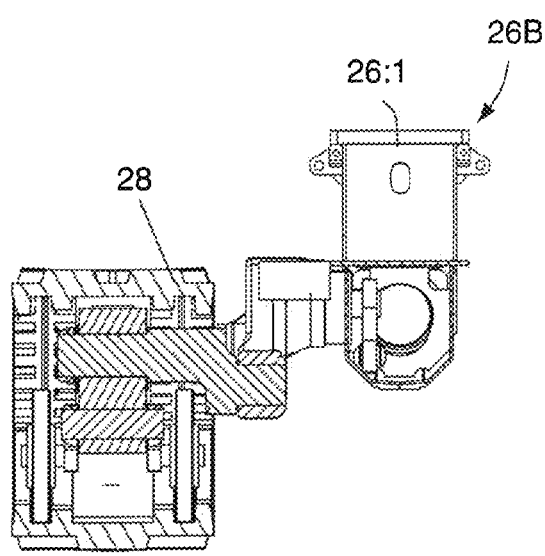
Figure 7:
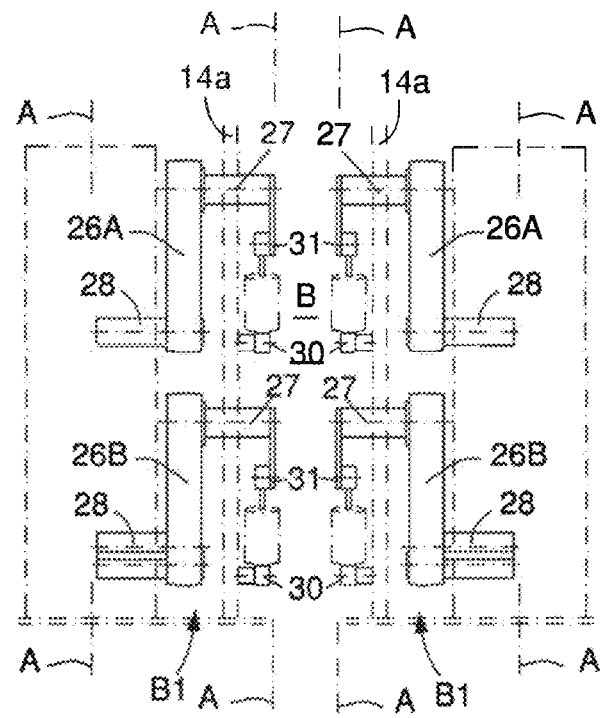
Figures 8A, 8B:
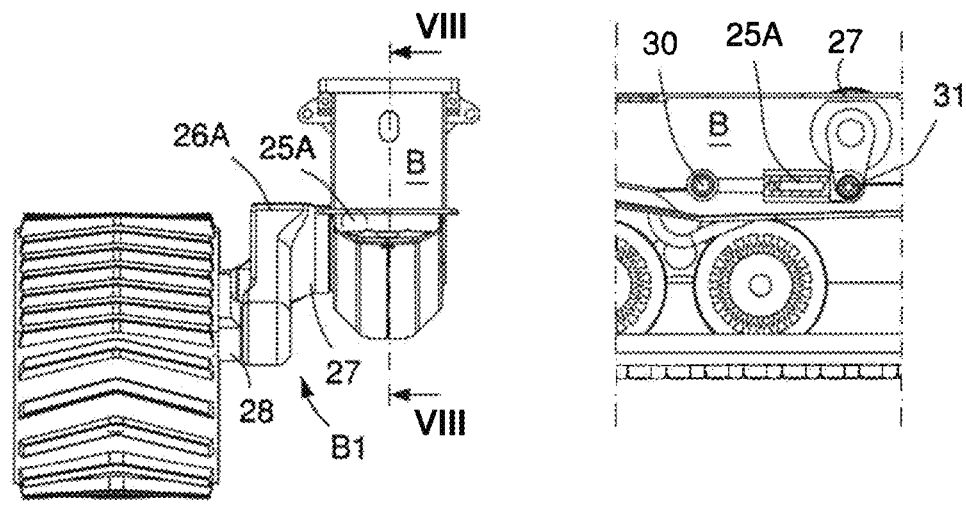
Figure 9A:
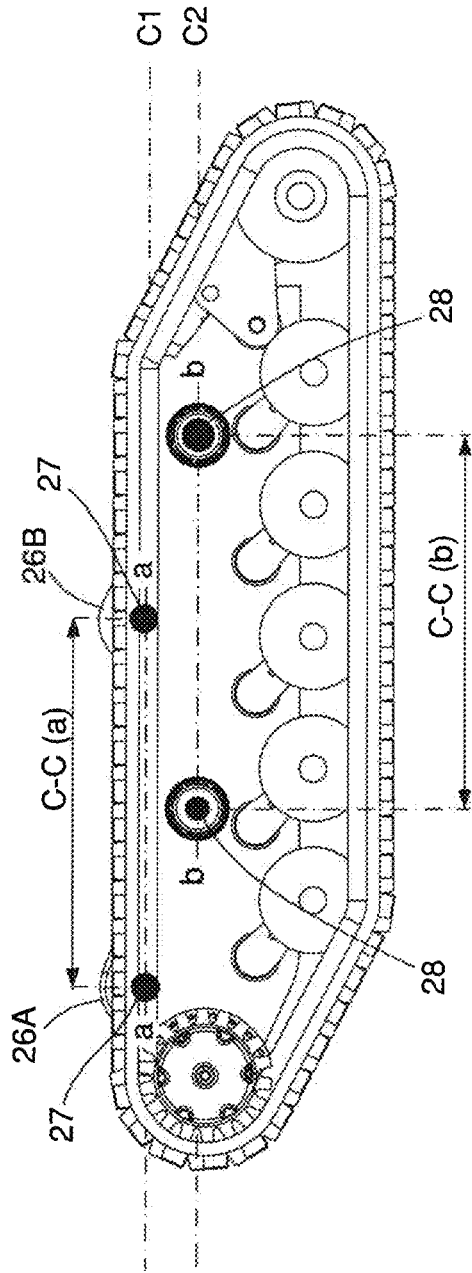
Figure 9B:
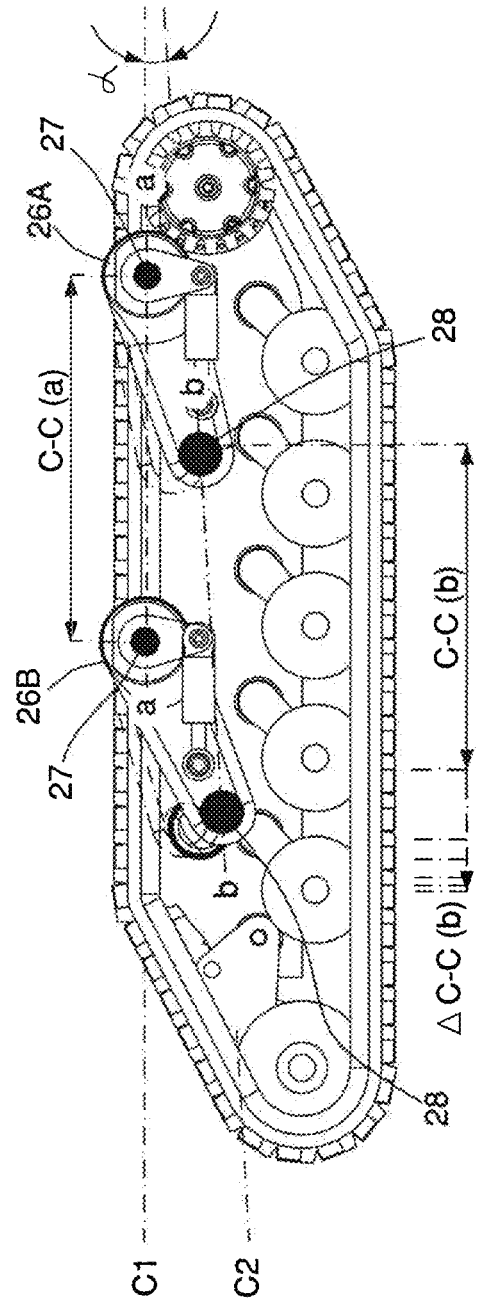
Figures 10A, 10B:
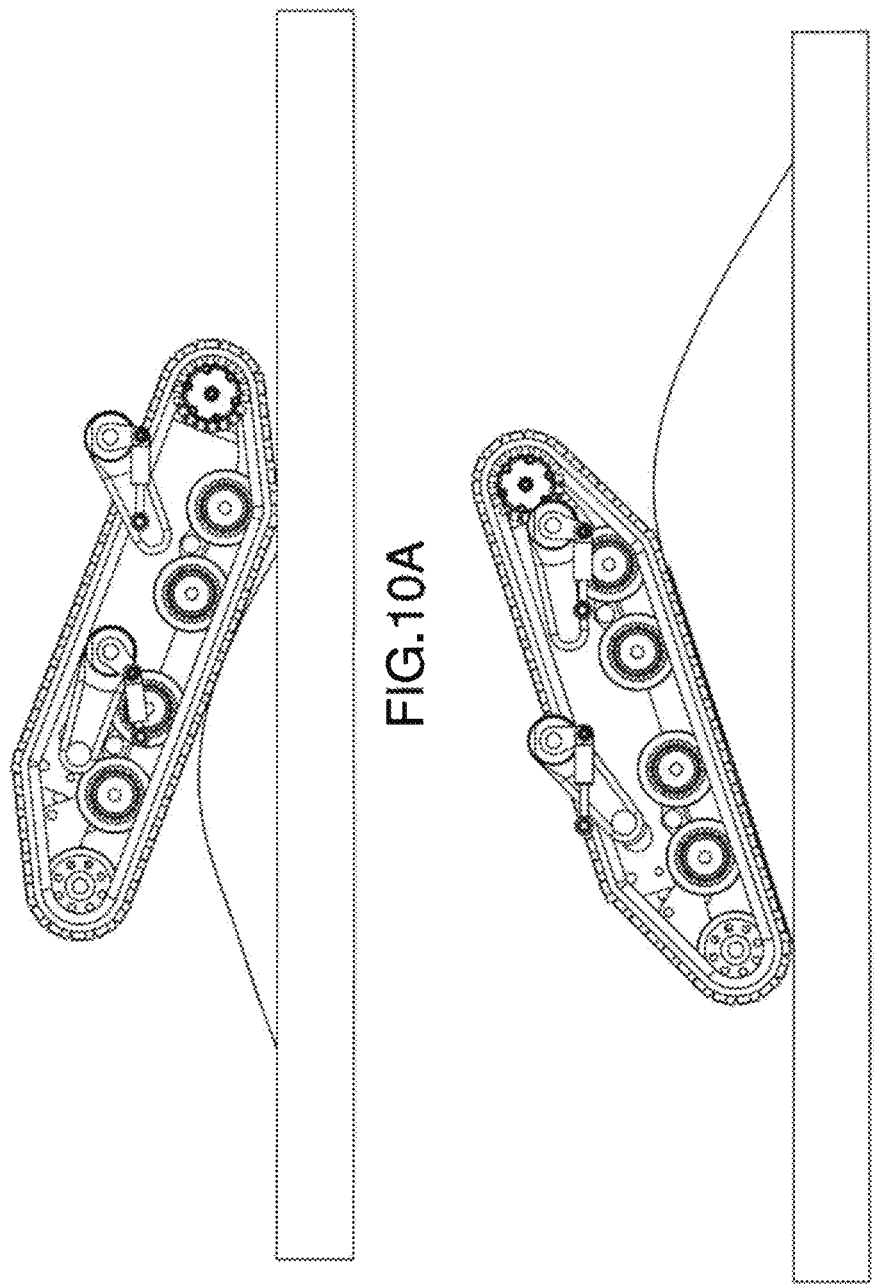

An embodiment of the invention will be described below in more detail with reference to the attached drawings, of which:

FIG. 1 shows a view in perspective of a tracked vehicle in the form of a forestry machine equipped with a suspension device according to the invention, FIG. 2 shows a view in perspective with a partially enlarged part of a part of a centre beam that is a component of a tracked vehicle with a suspension device in an alternative first embodiment of the invention, FIG. 3 shows a view in perspective with a partially enlarged part of a rear frame part that is a component of a tracked vehicle equipped with a suspension device in an alternative second embodiment of the invention, FIG. 4 shows a view in perspective of a track assembly viewed outwards from a side of the chassis of a vehicle, where the enlargement of detail that is part of the drawing shows in more detail an excentrically operating geared motion mechanism, FIG. 5 shows schematically a side view, partially in cross-section, of the excentrically operating geared motion mechanism viewed along the line V-V in FIG. 4, FIGS. 6A, 6B show a view in perspective of first and second pendulum arms, designed as double-armed levers, that are components of a suspension device according to the invention FIG. 7 shows schematically a plan view of a vehicle, with partially cut-away parts, equipped with a suspension device according to the invention, FIGS. 8A, 8B show a side view from the rear and a cross-sectional view along line VIII-VIII in FIG. 8A of a centre beam that is a component of a tracked vehicle with a spring strut that has been incorporated into an inner compartment of the same, FIGS. 9A, 9B show schematically a side view from the outside of a track assembly and a side view from the inside of a track assembly viewed outwards from the chassis side of the vehicle, FIGS. 10A, 10B show in a side view of a track assembly equipped with a suspension device according to the invention that, following the contours of the surface, moves over an obstacle in the terrain.

A tracked vehicle is generally denoted in the drawings by 1, which tracked vehicle is articulated (has an articulated frame) and comprises a vehicle combination that consists of a forward 1A and a rear 1B vehicle unit that are united in a jointed manner by an articulated joint 2. The articulated joint 2 rotates around a vertical axis of rotation C, see also FIG. 2. In this way the forward vehicle 1A and the rear vehicle 1B can pivot relative to each other in the sideways direction. The tracked vehicle 1 comprises control cylinders 3 that are active at the articulated joint 2.

The tracked vehicle 1 given as an example is constituted by, in the following embodiment of the invention that is described here, by a forestry machine. To be more precise, it is constituted by a vehicle combination in the form of what is known as a "forwarder", whose forward vehicle unit 1A supports a superstructure that includes a drive motor 4 and driver's cabin 5, and whose rear vehicle unit 1B supports a superstructure that includes a lifting crane 6 and a load compartment 7 for timber.

The forward 1A and rear vehicle units 1B of the vehicle 1 comprise a pair of driven track assemblies 10, each of which comprises, one on each side of a centre beam that is a component of the chassis of the vehicle, a track assembly with a driven endless track 11. A drive unit, not shown in the drawings, is assigned to each track assembly 10 at the relevant vehicle unit 1A, 1B in known manner, for propulsion of the vehicle combination.

The chassis of the vehicle is supported by the pair of track assemblies 10 on pendulum arms 26A, 26B that extend in the longitudinal direction of the vehicle and that are arranged in pairs, in the form of one forward member and one rear member, one on each side of a central chassis or framework unit that comprises what is known as a "centre beam" 14. As is shown in FIG. 3, the said centre beam 14 forms part of a frame or chassis that is a component of each vehicle unit 1A, 1B and that in known manner supports a propulsion chain, a control arrangement, etc.

With reference to FIGS. 2 and 3, the centre beam 14 of the chassis comprises a load-bearing frame that, in order for it to be lightweight and resistant to twisting, demonstrates a box form that limits an internal compartment B. See also FIGS. 7, 8A and 8B.

As is made most clear by FIG. 2, the centre beam 14 of the chassis is manufactured from two longitudinal beams 14a, known as "frame beams", that extend in the longitudinal direction of the vehicle unit, each of which has an upper flange 14b, a lower flange 14c and a connective web 14d. The said internal compartment B is limited principally between the said frame beams 14a that are separated by a distance. The two longitudinal frame beams 14a are united between their upper flanges 14b along essentially the complete length by a transverse piece of sheet metal 15 equipped with holes, while, in order to stiffen the chassis further, the frame beams 14a are united by a number of upper and lower transverse beams, not shown in the drawings.

As is shown in FIGS. 2 and 3 with respect to the rear vehicle unit 1B, the frame beams 14a are separated by struts with a transverse construction 16, the task of which is to form fixtures for the mounting of the said lifting crane 6, and attachment points for the hydraulic cylinders 3 that not only are components of the control unit of the articulated vehicle 1, but also hydraulic cylinders 17 that are components of a stabilisation unit that is arranged at the articulated joint of the articulated joint with the task of guiding and controlling the motion of the articulated joint around what is known as an "oscillation axis" that extends along the common longitudinal axis of the connected vehicle units 1A, 1B.

Turning again to FIG. 2, there is shown a part of a centre beam 14 that is a component of a tracked vehicle with a suspension device according to the present invention in an alternative first embodiment with an open suspension system.

Reference number 10 denotes a track assembly and reference number 14 denotes a centre beam that is a component of the chassis of the vehicle. The track assembly 10 comprises a track support beam 20 of the type known as a "skid beam", two wheels 21, 22 that are mounted in bearings on axles in a manner that allows rotation at a forward and at a rear end of the track support beam, of which wheels one is a driving wheel, several support wheels 23, and an endless track 11 that in a driving manner runs over the said wheels and support wheels in a plane of rotation A, A, a first suspension mounting, with which the support wheels 23 are suspended at the track support beam 20 in a manner that allows pivoting one at each end of a pendulum arm 24, a second suspension mounting comprising a combination of a first spring strut 25A and a first pendulum arm 26A and a combination of a second spring strut 25B and a second pendulum arm 26B with which combinations the centre beam 14 of the chassis is spring-damped at a forward and rear end of the track support beam 20. The first pendulum arm 26A that is a component of the track assembly 10 is located in front of the second pendulum 26B, when viewed in the normal direction of forward travel of the vehicle. Each pendulum arm 26A, 26B is fixed at its first end in a manner that allows pivoting at a first joint 27, 27 at the centre beam 14 of the chassis and is fixed at its second end in a manner that allows pivoting at a second joint 28, 28 in the track support beam 20. Each spring strut 25A, 25B is fixed at one of its ends 30, 30 in a jointed manner at the centre beam 14 of the chassis and at the other of its ends 31, 31 in a jointed manner at the pendulum arm 26A, 26B. It should be understood that the said pendulum arms 26A, 26B pivot in planes that are parallel to the plane of rotation A, A of the track 11.

In the following and onwards, there is described with reference to FIG. 3 a suspension device according to the present invention in an alternative second embodiment in a discrete protected design.

FIG. 4 shows a track assembly 10 that is a component of the present invention, as it appears when viewed from the chassis side of the vehicle 1, and onwards in the outwards direction. As is made clear, the track assembly 10 comprises a track support beam 20 which is here constituted by what is known as a "skid beam", two wheels 21, 22 that are mounted in bearings in the track support beam in a manner that allows rotation on axles that are perpendicular to the axis of rotation C of the articulation and located at a forward and at a rear end of the track support beam 20, and one of which wheels 21 is a driving wheel, several support wheels 23 that are spring-loaded suspended at the track support beam at each end of a pendulum arm 24 that is itself also mounted in bearings in a manner that allows rotation at the track support beam 20 on a hub 25 with an axis that is perpendicular to the axis of rotation C (FIG. 3) of the articulation. In the embodiment example that is described here, the track assembly 10 is equipped with five support wheels 23, each one of which is suspended at the track support beam 20 in a manner that allows free pivoting at the relevant pendulum arm 24. In this way, the track assembly 10 uses a hub 25 in which a torsional spring of elastic material is included, for example rubber, at the joint of the said pivoted arms 24 for the support wheels 23.

In an alternative design that is best made clear by FIGS. 2 and 3, the support wheels 23 can be formed in what is known as "first suspension mounting" and be suspended at the track support beam at a hub by means of pendulum arms of the type known as "tandem arms" that are freely pivotable (and not spring-loaded). In other words, they are suspended at a pendulum arm with two shanks arranged in essentially a V shape. As has been previously described, the endless track 11 is a driving track and is arranged to run in a pathway around the said relevant wheels 21, 22, support wheels 23, and in certain regions also over an upper part of the track support beam 20.

In another design of the invention, a first suspension mounting is formed with which the support wheels 23 are suspended in a spring-loaded way one at each end of a pendulum arm 24, at the track support beam 20 that is a component of the track assembly 10. What is known as a "second suspension mounting" is also included in the invention, which mounting includes a pivot arm arrangement with two pendulum arms that connected in a manner that allows pivoting between the centre beam 14 of the chassis and the track support beam 20, whereby the said pendulum arms that operate in pairs are fixed in a jointed manner between the two wheel axles of the two wheels 21, 22 at the track support beam 20.

As is shown in FIG. 4, the said second suspension mounting comprises for each track assembly a pivot arm arrangement that includes a combination of a first spring strut 25A and a first pendulum arm 26A with which the centre beam 14 of the chassis is able to pivot in a spring-damped manner at a forward end of the track support beam 20, and a combination of a second spring strut 25B and a second pendulum arm 26B with which the centre beam 14 of the chassis is pivoted in a spring-damped manner at a rear end of the track support beam 20.

Of the two pendulum arms 26A, 26B that operate in pairs, one is located in front of the other when viewed in the normal direction of forward travel of the vehicle, and each one of the said pendulum arms for the forward vehicle unit 1A shown in FIG. 1 is oriented obliquely backwards upwards, and for the rear vehicle unit 1B oriented obliquely forwards upwards, such that each one of the pendulum arms that operate in pairs together with its connected parts forms geometrical parallelograms.

As is shown in FIGS. 4 and 7, the two pendulum arms 26A, 26B can be pivoted in a plane A, A that is parallel to the plane of rotation of the track 11 in the track assembly 10. As is made clear in general by FIG. 4, each pendulum arm 26A, 26B is fixed at its first end in a manner that allows pivoting at a first joint 27, 27 at the centre beam 14 of the chassis and at its second end at a second joint 28, 28 at the track support beam 20. Furthermore, each spring strut 25A, 25B is fixed at one of its ends 30, 30 in a jointed manner at the centre beam 14 of the chassis and at its second end 31, 31 in a jointed manner at a pendulum arm 26A, 26B. Furthermore, the said pendulum arms 26A, 26B are arranged to pivot in planes that are parallel to the plane of rotation of the track 11.

As is most clearly shown by FIGS. 4 and 6A, 6B, the said pendulum arms 26A, 26B comprise in one design of the invention double-armed levers with two lever arms 26:1, 26:2 placed essentially in a V shape that are united at an intermediate web 26:3, and where the first intermediate web 26:3 of the pendulum arm 26A is mounted in bearings in a manner that allows pivoting at a first joint that is defined by a hub shell 27 of the frame beam 14*a*, partially visible in FIG. 3, at the centre beam 14 of the chassis. In a corresponding manner, the web 26:3 of the second pendulum 26B is mounted in bearings in a manner that allows pivoting at a second joint that is defined by the hub shell 27 in the parts, partially visible in FIG. 4, of the frame beam 14*a* that is a component of the centre beam 14 of the chassis.

With reference also to FIG. 7, it is made clear how the one longer lever 26:1 and the shorter second lever 26:2 of the first and second pendulum arms 26A, 26B, respectively, are arranged to pivot each in planes A, A that are parallel to each other, while being located at a distance from each other. As is most clearly shown by FIG. 7 and FIGS. 8A, 8B, the one longer lever 26:1 of the pendulum arms 26A, 26B pivots in a side compartment that is generally denoted by B1 and that is limited between the centre beam 14 of the chassis and the track support beam 20, while the shorter second lever 26:2 pivots in a plane that is located in the compartment B that is limited inside the centre beam 14 of the chassis.

With reference also to FIG. 5, the one considerably longer lever 26:1 of the first pendulum arm 26A is equipped at its free end with a guide plug, with which it is mounted in bearings in a manner that allows pivoting at a hub shell 28 at a first joint in the track support beam 20, and the considerably shorter second lever 26:2 is in connection in a manner that transfers power with the centre beam 14 of the chassis through the said first spring strut 25A. In a corresponding manner, the one considerably longer lever 26:1 of the second pendulum arm 26B is equipped at its free end with a guide plug, with which it is mounted in bearings in a manner that allows pivoting at a hub shell 28 at a second joint in the track support beam 20, and the considerably shorter second lever 26:2 is in connection in a manner that transfers power with the centre beam 14 of the chassis through the said second spring strut 25B.

The said relevant spring struts 25A, 25B are united in a jointed manner at the ends partly with the shorter second lever 26:2 of the pendulum arm 26A, 26B, and the centre beam 14 of the chassis, respectively.

It should be understood that the spring struts 25A, 25B, each one of which advantageously comprises a hydraulic cylinder, can through a valve function, not shown in the drawings, in a hydraulic circuit with a flow of pressurised medium, apply a torque to the said second lever 26:2 with which the position of the centre beam 14, and thus also of the superstructure, can be controlled relative to the track assembly 10 and the base with respect to attitude or level, independent of the ground conditions. In other words, the design according to the invention makes it possible to actively pivot or raise/lower the centre beam 14 of the chassis relative to the track assembly 10 in a design in which the spring struts 25A, 25B at the second set of spring struts comprise hydraulic cylinders. Alternatively, the flow of hydraulic medium can be restricted, blocked, such that the said relevant hydraulic cylinder offers limited spring facility or damping, or locks, quite simply, the centre beam 14 of the chassis in a fixed position relative to the track assembly 10.

FIG. 9A displays in more detail the first and second joints at the relevant hub shell 27 between the first and second pendulum arms 26A, 26B and the track support beam 20, and FIG. 9B displays the first and second joints at the relevant hub shell 28 between the first and second pendulum arms 26A, 26B and the centre beam 14 of the chassis, i.e. at one of the frame beams 14*a*.

Reference designator C-C (a) denotes a centre-centre distance between the first and second axes of rotation of the pendulum arms 26A, 26B at the relevant hub shell 27 with the centre beam 14 of the chassis, while reference designator C-C (b) denotes a centre-centre distance between the first and second axes of rotation of the pendulum arms 26A, 26B at the relevant hub shell 28 with the track support beam 20.

It should be understood that, in an alternative design of the invention in which the track assembly 10, and in this way also the forward and rear joints 27, 28 of the pendulum arms 26A, 26B with the centre beam 14 of the chassis or track support beam 20, will carry out parallel motions relative to each other in a vertical plane, the separations of the axes of the joints, or their C-C dimensions, i.e. C-C (a) and C-C (b), will be constant. In this design the centre beam 14 of the chassis is limited to pivot parallel at the track assembly 10.

In a further alternative design, however, the suspension device may be so designed that C-C (a), i.e. the distance between the joints of the pendulum arms 26A, 26B at the relevant hub shell 27 at the centre beam 14 of the chassis, is always constant, while C-C (b), i.e. the distance between the joints of the pendulum arms 26A, 26B at the relevant hub shell 28 at the track support beam 20, is allowed to vary within a pre-determined specified interval, for example ±200 mm, which linear margin of motion is denoted by ΔC-C (b) in FIG. 9.

FIG. 9B shows how the track assembly 10 (i.e. the chassis) can take up different angles α upwards or downwards relative to a reference line C1 that may represent a horizontal plane. Furthermore, there is illustrated with the central line C2, which passes through the relevant first and second joints 28 of the pendulum arms 26A, 26B at the track support beam 20, how these two lines set at an angle to each other through the two centre axes C-C (a) and C-C (b), respectively, will intersect each other if the bogie 10 takes up an angled position relative to the horizontal plane. It should be understood that forces (breaker forces) that are collinear with the central lines C-C (a), C-C (b) through the axes 28 of the relevant first and second joints can arise if the bogie 10 pivots freely in the manner that is illustrated in FIG. 9B.

Once again with reference to FIGS. 4, 5 and 6A, 6B: in order to make it possible for the track assembly 10 to pivot freely and to control its attitude within a pre-determined specified range of angles α, for example ±20° relative to the horizontal plane C1, the present suspension device comprises in an alternative design an arrangement arranged at any one of the joints 27, 27; 28, 28 that has the ability to convert a rotating motion at any one of the said joints for the pendulum arms 26A, 26B to a forward and return translational motion in a direction that is collinear with a central line C-C (a), C-C (b) that intersects the axles 27, 28 of the relevant joint or joints.

In the embodiment that is described here, the arrangement comprises an excentrically operating geared motion mechanism in the form of an excentric coupling of the type that is shown schematically in the enlarged drawing of detail in FIG. 4 and FIG. 5, and it is arranged to convert the rotating motion at any one of the joints 27, 27; 28, 28 to a forward and return translational motion.

It should in this case be understood that in the design described here, only the second pendulum arm 26B is equipped with the said arrangement for the conversion of motion. Thus, the first pendulum arm 26A is not equipped with the said arrangement.

In an alternative design, it would, of course, be possible for the arrangement for the conversion of motion to be constituted by any arrangement with an equivalent function known to one skilled in the arts, for example some form of epicyclic gear that allows epicyclic motion. In its most trivial form, the arrangement could be constituted by, for example, some type of simple sliding mechanism.

FIGS. 10A, 10B show how a track assembly 10 equipped with a suspension device according to the invention, with a large surface contact with respect to area, a large "traction", permits the tracks to follow the contour of the surface when the track moves over an obstacle in the terrain.

Aspect A. A suspension device for a tracked vehicle, which vehicle (1) comprises a pair of track assemblies where one track assembly (10) is located on each side of a centre beam (14) that is a component of the chassis of the vehicle, and each track assembly (10) comprises a track support beam (20), a first wheel (21) that is mounted in bearings in a manner that allows rotation at a forward end of the track support beam, a second wheel (22) that is mounted in bearings in a manner that allows rotation at a rear end of the track support beam, and of which wheels one is a driving wheel, several support wheels (23) and an endless track 11 that in a driving manner runs over the said wheels and support wheels in a plane of rotation A, A, a first suspension mounting with which each support wheel (23) is suspended at the track support beam (20) in a manner that allows pivoting at one end of a support wheel pendulum arm (24), a second suspension mounting comprising a combination of a first spring strut (25A) and a first spring-damping pendulum arm (26A) and a combination of a second spring strut (25B) and a second spring-damping pendulum arm (26B) with which combinations the centre beam (14) of the chassis is spring-damped at a forward and rear end of the track support beam (20), characterised in that each first and second spring-damping pendulum arm (26A, 26B) comprises a double-armed lever, of which one lever (26:1) and the second lever (26:2) are mutually united at an intermediate web (26:3), that the intermediate web (26:3, 26:3) at each first and second double-armed lever (26A, 26B) formed in this way is mounted in bearings in a manner that allows pivoting at an axis at a joint (27, 27) in the centre beam (14) of the chassis such that the said double-armed levers (26A, 26B) can pivot in planes that are parallel with the plane of rotation (A, A) of the track (11), that one lever (26:1, 26:1) of each first and second double-armed lever (26A, 26B) formed in this way is mounted in bearings in a manner that allows pivoting at an axis at a joint (28, 28) in the track support beam (20), that the second lever (26:2) of each first and second double-armed lever (26A, 26B) formed in this way is united in a manner that transfers power with the centre beam (14) of the chassis through one of the said first and second spring struts (25A, 25B), and that the centre beam (14) that is supported in a spring-damped manner at the track support beam (20) can pivot freely and its attitude can be controlled within a pre-determined specified range of angles (α) through the influence of a motion conversion arrangement arranged at one of the joints (27, 27; 28, 28) with the ability to convert a rotating motion at the joint to a forward and return translational motion at the joint.

Aspect B. The suspension device according to Aspect A, whereby the first suspension mounting comprises a spring-loaded suspension with which each one of the support wheels (23) suspended at the support wheel track support beam (24) is suspended in a spring-loaded manner that allows pivoting at the track support beam (20).

Aspect C. The suspension device according to any one of Aspects A-B, whereby the first and second double-armed levers (26A, 26B) are oriented along the longitudinal axis of the vehicle (1).

Aspect D. The suspension device according to any one of Aspects A-C, whereby one lever (26:1) of the first and second double-armed levers (26A, 26B) is oriented obliquely upwards and in a direction forwards or oriented obliquely upwards and in a direction backwards, seen in the normal direction of travel of the vehicle.

Aspect E. The suspension device according to any one of Aspects A-D, whereby one lever (26:1) of the first and second double-armed levers (26A, 26B) is longer than the second lever (26:2).

Aspect F. The suspension device according to any one of Aspects A-E, whereby the levers (26:1, 26:2) of the first and second double-armed levers (26A, 26B) are mutually set in a V shape.

Aspect G. The suspension device according to any one of Aspects A-F, whereby one lever (26:1) and the second lever (26:2) of the first and second double-armed levers (26A, 26B) are each arranged to pivot in planes (A, A) which planes are parallel to each other while being located at a distance from each other, and that the said one lever (26:1) pivots in a side compartment (B1) that is limited between the centre beam (14) of the chassis and the track support beam (20) while the said second lever (26:2) pivots in a plane that is located in an internal compartment (B) that is limited inside the centre beam (14) of the chassis.

Aspect H. The suspension device according to Aspect G, whereby the first and second spring struts (25A, 25B) are incorporated into the internal compartment (B) that is limited inside the centre beam (14) of the chassis.

Aspect I. The suspension device according to any one of Aspects A-H, whereby the forward and return translational motion is collinear with a central line (C-C(a), C-C(b)) that intersects two of the axles (27, 27; 28, 28) of the joints.

Aspect J. The suspension device according to any one of Aspects A-I, whereby the arrangement to convert motion comprises any one of the following: an excentrically operating geared motion mechanism, a sliding mechanism, an epicyclic gear.

Aspect K. A tracked vehicle, for example a forestry machine or similar, characterised in that it comprises a suspension device according to any one of the above Aspects A-J.

The invention is not limited to what has been described above and shown in the drawings: it can be changed and modified in several different ways within the scope of the innovative concept defined by the attached patent claims.

The invention claimed is:

1. A suspension device for a tracked forwarder, which forwarder comprises a pair of track assemblies where one track assembly is located on each side of a center beam that is a component of a chassis of the forwarder, and each track assembly comprises a track support beam, a first wheel that is mounted in bearings in a manner that allows rotation at a forward end of the track support beam, a second wheel that is mounted in bearings in a manner that allows rotation of the second wheel at a rear end of the track support beam, and of which wheels one is a driving wheel, several support wheels and an endless track that in a driving manner runs over the wheels and support wheels in a plane of rotation, a first suspension mounting with which each support wheel is suspended at the track support beam in a manner that allows pivoting at one end of a support wheel pendulum arm, a second suspension mounting comprising a combination of a first spring strut and a first spring-damping pendulum arm and a combination of a second spring strut and a second spring-damping pendulum arm with which combinations the center beam of the chassis is spring-damped at a forward and rear end of the track support beam, wherein each spring strut comprises a gas hydraulic configuration comprising a hydraulic cylinder, the first suspension mounting comprises tandem arms levers having two legs arranged in a V-shape and equipped with support wheels which, via a hub, are pivotably suspended in the track support beam, each of the first and second spring-damping pendulum arms of the second suspension mounting comprises a double-armed lever, of which one lever and a second lever are mutually united at an intermediate web, that the intermediate web at each first and second double-armed lever formed in this way is mounted in bearings in a manner that allows pivoting at an axis at a joint in the center beam of the chassis such that the double-armed levers can pivot in planes that are parallel with the plane of rotation of the track, that the one lever of each first and second double-armed lever formed in this way is mounted in bearings in a manner that allows pivoting at an axis at a joint in the track support beam, that the second lever of each first and second double-armed lever formed in this way is united in a manner that transfers power with the center beam of the chassis through one of the first and second spring struts, and that the center beam that is supported in a spring-damped manner at the track support beam can pivot and its level above ground and attitude can be controlled within a pre-determined specified range of angles by the spring struts.

2. The suspension device according to claim 1, whereby the first and second double-armed levers extend in at least a portion of a longitudinal axis direction of the forwarder.

3. The suspension device according to claim 1, whereby the one lever of the first and second double-armed levers is oriented obliquely upwards and in a direction forwards or oriented obliquely upwards and in a direction backwards, seen in the normal direction of travel of the forwarder.

4. The suspension device according to claim 1, whereby the one lever of the first and second double-armed levers is longer than the second lever.

5. The suspension device according to claim 4, whereby the first and second spring struts are incorporated into an internal compartment that is limited inside the center beam of the chassis.

6. The suspension device according to claim 1, whereby the levers of the first and second double-armed levers are mutually set in a V shape.

7. The suspension device according to claim 1, whereby the one lever and the second lever of the first and second double-armed levers are each arranged to pivot in planes which planes are parallel to each other while being located at a distance from each other, and that the one lever pivots in a side compartment that is limited between the center beam of the chassis and the track support beam while the second lever pivots in a plane that is located in an internal compartment that is limited inside the center beam of the chassis.

* * * * *